(12) United States Patent
Wilson

(10) Patent No.: US 7,719,557 B2
(45) Date of Patent: May 18, 2010

(54) APPARATUS FOR PROVIDING DELAY SIGNALS TO PERFORM PRINT SCAN LINE SYNCHRONIZATION WITHIN A LASER PRINTER

(75) Inventor: John C. Wilson, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 799 days.

(21) Appl. No.: 11/451,832

(22) Filed: Jun. 13, 2006

(65) Prior Publication Data

US 2007/0286655 A1  Dec. 13, 2007

(51) Int. Cl.
*B41J 2/47*  (2006.01)
*B41J 2/435*  (2006.01)

(52) U.S. Cl. ...................... 347/235; 347/250
(58) Field of Classification Search .......... 347/235, 347/250; 399/316
See application file for complete search history.

(56) References Cited

U.S. PATENT DOCUMENTS

| 6,498,617 | B1 * | 12/2002 | Ishida et al. | 347/252 |
| 6,563,888 | B1 * | 5/2003 | Toriyama | 375/340 |
| 2003/0118142 | A1 * | 6/2003 | Xiu et al. | 375/376 |
| 2005/0117940 | A1 * | 6/2005 | Taguchi | 399/316 |

\* cited by examiner

*Primary Examiner*—Matthew Luu
*Assistant Examiner*—Kendrick X Liu
(74) *Attorney, Agent, or Firm*—Dillon & Yudell LLP; Antony P. Ng

(57) ABSTRACT

An apparatus for providing delay signals to perform print scan line synchronizations within a laser printer is disclosed. The apparatus includes a voltage-control oscillator, a frequency divider and multiple output control modules. The voltage-control oscillator converts a clock signal to a higher frequency signal. The frequency divider then reduces the frequency of the higher frequency signal. Then, each of the output control modules generates a delay signal, and each of the delay signals is delayed by no more than one tenth of a clock cycle from an adjacent one of the delay signals.

8 Claims, 3 Drawing Sheets

APPARATUS FOR PROVIDING DELAY SIGNALS TO PERFORM PRINT SCAN LINE SYNCHRONIZATION WITHIN A LASER PRINTER

BACKGROUND OF THE INVENTION

1. Technical Field

The present invention relates to electrophotographic printers in general, and, in particular, to an apparatus for improving image fidelity on electrophotographic printers. Still more particularly, the present invention relates to an apparatus for providing delay signals to perform print scan line synchronization within a laser printer.

2. Description of Related Art

Laser printers are designed to produce an image on paper or other print material at virtual positions defined by a digital raster. These virtual positions in the raster are known as "pixels." In laser printers, the image is typically first produced on a charged photoconductive material by scanning the photoconductor with a laser beam in a sequence of scan lines. A laser printer may scan the surface of the photoconductive material with a laser in the sequence of scan lines using a rotating polygonal mirror. As a line is being scanned, or written, the laser beam is energized during the extent of each pixel. When the laser beam is energized, the portion of the photoconductor upon which the laser energy impinges is discharged, thereby producing a charge-pattern copy of the desired image on the photoconductor. The printed output is obtained by attracting toner to the charge-pattern and by transferring the developed image to paper or other types of print material.

If the laser beam is modulated, then variations in charge are translated to proportionate amounts of toner deposited on a sheet of paper in the printer. The laser scans the photoreceptor surface to generate a signal at the beginning of each scan line that is used to initiate modulation of the laser beam for that scan line. Such signal is called a beam detect signal, and is asynchronous to the input clock reference oscillator. The clock reference oscillator determines the width of each printed pixel.

The present disclosure provides an apparatus for providing delay signals to perform print scan line synchronization within a laser printer.

SUMMARY OF THE INVENTION

In accordance with a preferred embodiment of the present invention, an apparatus for providing delay signals to perform print scan line synchronizations within a laser printer includes a voltage-control oscillator, a frequency divider and multiple output control modules. The voltage-control oscillator converts a clock signal to a higher frequency signal. The frequency divider then reduces the frequency of the higher frequency signal. Then, each of the output control modules generates a delay signal, and each of the delay signals is delayed by no more than one tenth of a clock cycle from an adjacent one of the delay signals.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
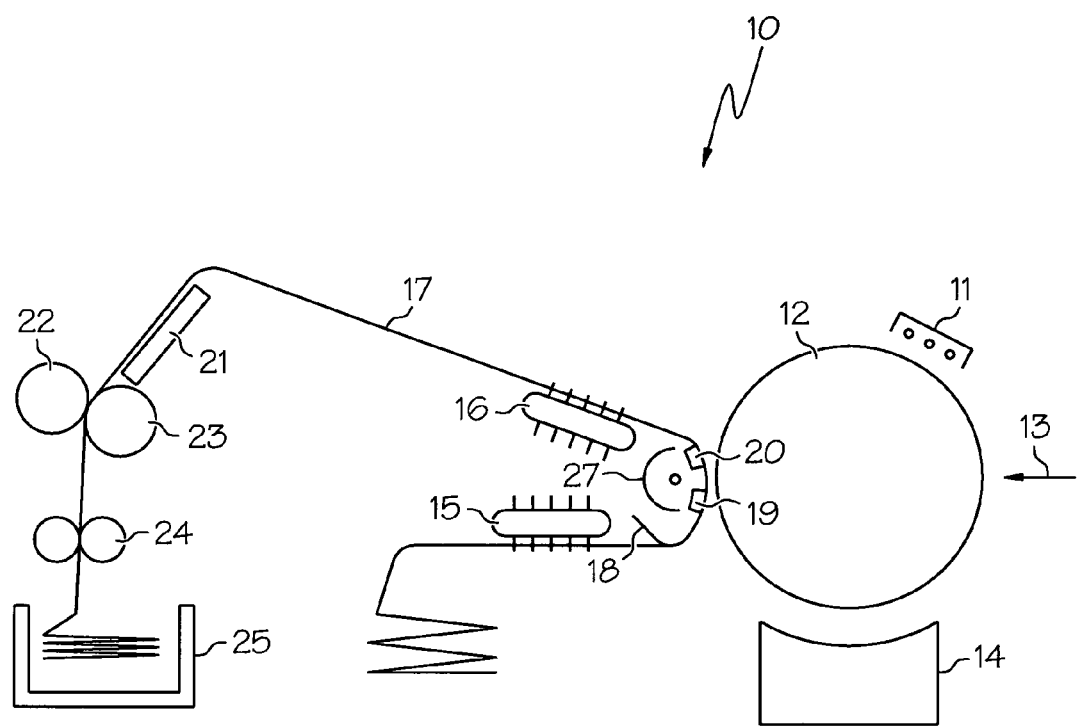
FIG. 1 is a cross-sectional view of an electrophotographic printing system, in accordance with a preferred embodiment of the present invention.

Referring now to the drawings and in particular to FIG. 1, there is depicted a cross-sectional view of an electrophotographic printing system, in accordance with a preferred embodiment of the present invention. As shown, an electrophotographic printing system 10 includes a charger 11, a photosensitive drum 12, a laser light beam 13, a developer 14, a first tractor 15, and a second tractor 16. During operation, a sheet of printing paper 17 is initially positioned by first tractor 15. Printing paper 17 is then conveyed to a second tractor 16 via a retractor spring 18, a lower retractor 19 and an upper retractor 20. Developed toner images on photosensitive drum 12 are then transferred onto printing paper 17 by an image transfer unit 27.

Electrophotographic printing system 10 also includes a preheating plate 21 for fixing developed toner images, a heat roll 22, a back-up roll 23, a pair of puller rollers 24, and a stacker 25. As printing paper 17 is conveyed further by second tractor 16, printing paper 17 passes between heat roll 22 and back-up roll 23, causing the toner images on printing paper 17 to be fixed onto printing paper 17. After the completion of the fixing operation, printing paper 17 is received in stacker 25.

In order to accomplish the printing in electrophotographic printing system 10, a toner having a relatively low melting temperature is used such that electrically charged toner images are developed on photosensitive drum 12 and, after transference of the developed toner images onto one surface of printing paper 17, the images are fixed onto printing paper 17 under the pressure from heat roller 22 and backup roller 23. Rollers 22 and 23 are preferably made of aluminum tubes coated with a film of tetrafluoroethylene-based synthetic resin and a halogen lamp (not shown) incorporated within the aluminum tubes. In addition, back-up roller 23 is constructed of a heat resistant silicone rubber. The surface of back-up roller 23 is coated with a film of tetrafluoroethylene-based silicone synthetic resin having excellent releasability.

Figure 2:
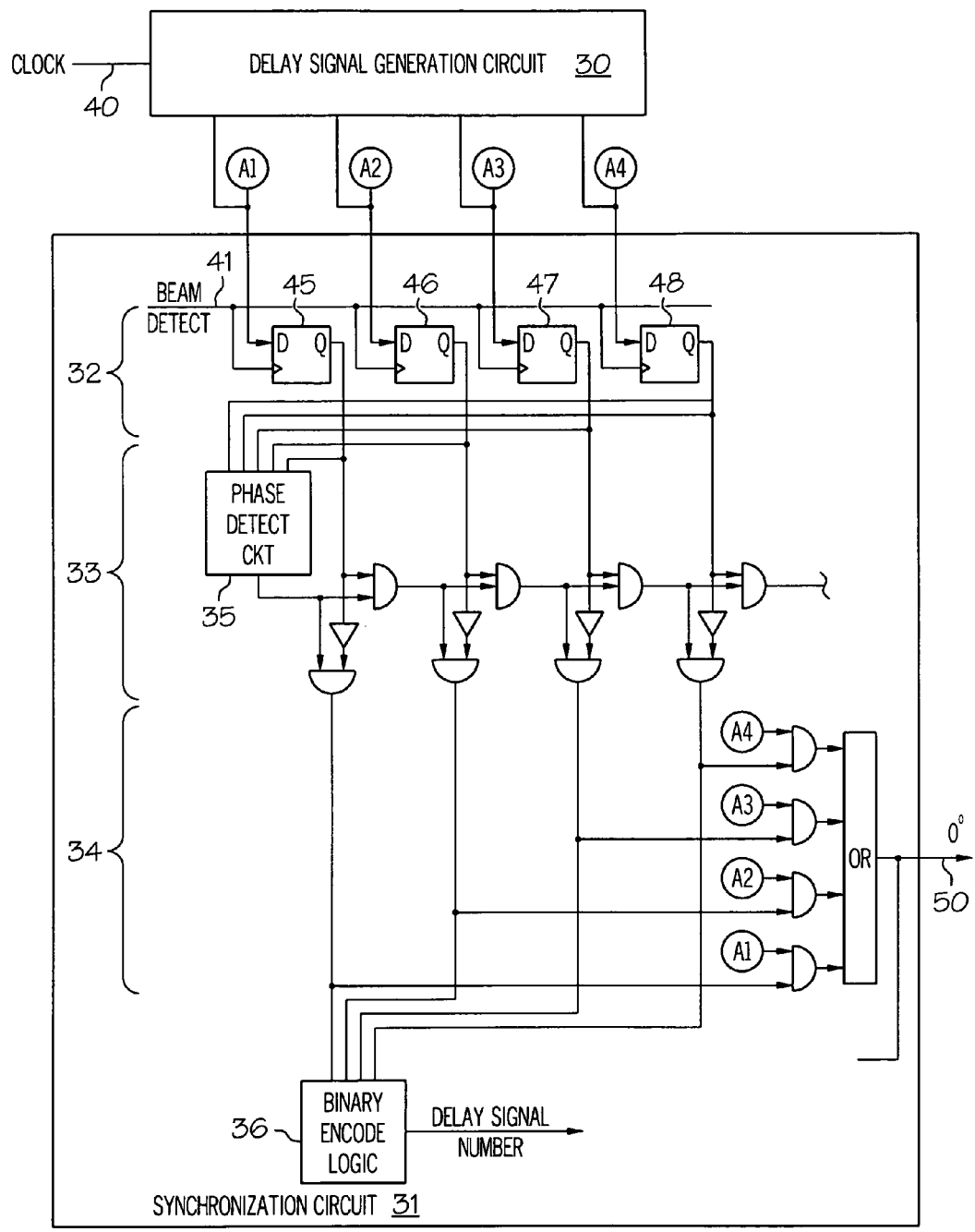
FIG. 2 is a block diagram of a delay signal generation circuit and a synchronization circuit within the electrophotographic printing system of FIG. 1, in accordance with a preferred embodiment of the present invention.

With reference now to FIG. 2, there is depicted a block diagram of a delay signal generation circuit and a synchronization circuit, in accordance with a preferred embodiment of the present invention. Based on an input clock signal 40, a delay signal generation circuit 30 provides various delay signals A1-A4. In turn, a synchronization circuit 31 provides a clock signal transition that is most closely positioned in time (i.e., 0° phase) to a beam detect signal 41.

As shown, synchronization circuit 31 includes a snapshot register 32, a search circuit 33 and a selector circuit 34. Snapshot register 32 includes flip-flops 45-48 that are clocked by beam detect signal 41 to register the levels of delay signals A1-A4 during the transition time of beam detect signal 41. The output of each of flip-flops 45-48 indicates the level of a respective one of delay signals A1-A4 at the time of occurrence of the beam detect transition. The outputs from flip-flops 45-48 should exhibit multiple logical zeros followed by multiple logical ones (or vice-versa). Search circuit 33 includes a phase detect circuit 35 for determining whether a metastable state exists or not. If a metastable state does not exist, phase detect circuit 35 provides an output equal to the high or low state output of flip-flop 45.

Search circuit 33 examines the outputs of flip-flops 45-48 to determines which output of flip-flops 45-48 manifests a level transition (i.e., a high level following a series of low levels or vice-versa). Such determination is made by using a carry select propagation scheme that disables all AND gates within search circuit 33 prior to the level transition and all AND gates subsequent to the transition. As a result, only one of the AND gates within search circuit 33 provides a gating output to one of the AND gates in selector circuit 34. Thus, one of the AND gates in selector circuit 34 is gated to enable passage therethrough of a delayed clock signal appearing at one of outputs A1-A4 as a 0° phase clock signal 50. In addition, a binary encode logic module 36 determines the exact delay signal (i.e., one of delay signals A1-A4) from delay signal generation circuit 30 that outputs 0° phase clock signal 50.

Figure 3:
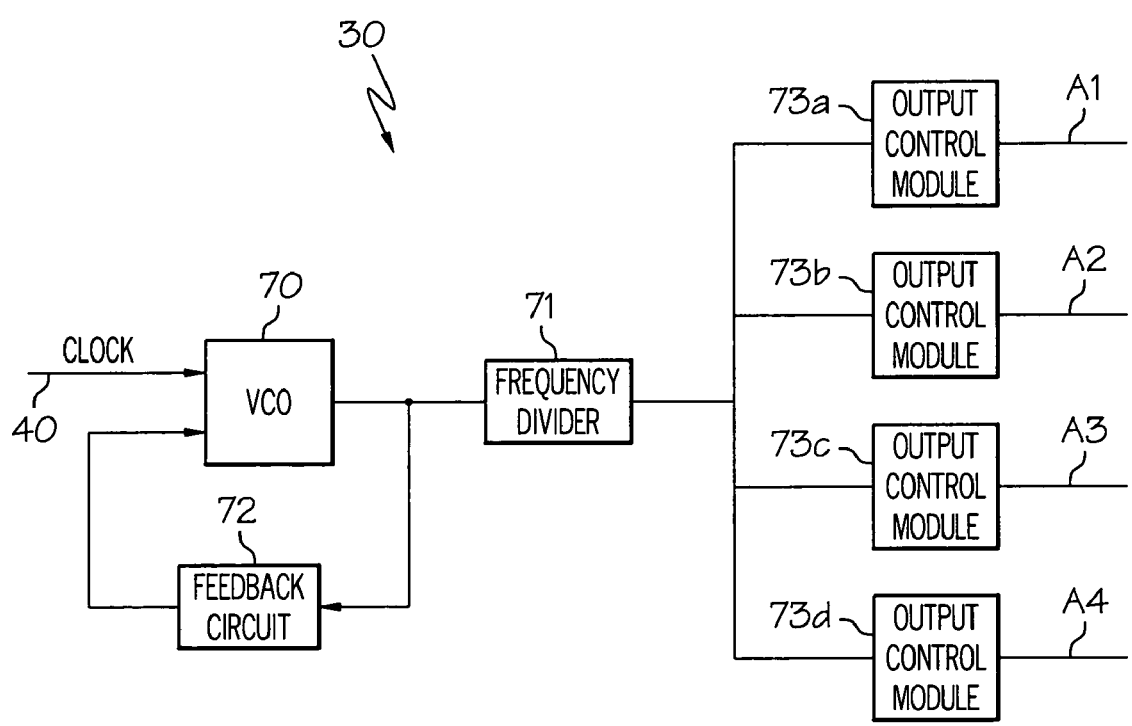
FIG. 3 is a detailed block diagram of the delay signal generation circuit from FIG. 2, in accordance with a preferred embodiment of the present invention.

Referring now to FIG. 3, there is depicted a detailed block diagram of delay signal generation circuit 30, in accordance with a preferred embodiment of the present invention. As shown, delay signal generation circuit 30 includes a voltage-control oscillator (VCO) 70, a frequency divider 71, a feedback circuit 72 and output control modules 73a-73d. Frequency divider 71 is set to provide VCO 70 a frequency with a cycle time that can be used to produce different skew times, one for each of output control modules 73a-73d. The frequency of VCO 70 should remain in a pre-defined range so it will remain in lock. Skew times can only be defined in multiples of the cycle time of VCO 70.

Output control modules 73a-73d provides delay signals A1-A4, respectively. Each of delay signals A1-A4 is a slight variation of input clock signal 40. Specifically, each of delay signals A1-A4 is delayed by no more than 1/10 of a clock cycle from an adjacent delay signal. For example, delay signal A1 is delayed by approximately 1/10 of a clock cycle from input clock signal 40, delay signal A2 is delayed by approximately 1/10 of a clock cycle from delay signal A1, delay signal A3 is delayed by approximately 1/10 of a clock cycle from delay signal A2, delay signal A4 is delayed by approximately 1/10 of a clock cycle from delay signal A3.

Delay signals A1-A4 must be separated very closely to 1/10 of a clock cycle from an adjacent delay signal. If the differential between two adjacent delay signals is too much more than 1/10 of a clock cycle, jitter will occur and the print quality on paper will be unacceptable. When beam detect signal 41 is received, one of delay signals A1-A4 having the smallest phase difference from beam detect signal 41 is selected for printing a print scan.

As has been described, the present invention provides an apparatus for providing delay signals to perform print scan line synchronization within a laser printer. Although only four delay signals are shown to illustrate the principle of the present invention, it is understood by those skilled in the art that the present invention is applicable to any number of delay signals.

While the invention has been particularly shown and described with reference to a preferred embodiment, it will be understood by those skilled in the art that various changes in form and detail may be made therein without departing from the spirit and scope of the invention.

What is claimed is:

1. An apparatus for performing print scan line synchronizations within a laser printer, said apparatus comprising:
    a delay signal generation circuit for generating a plurality of delay signals based on a clock signal, wherein said delay signal generation circuit includes
        a voltage-control oscillator for converting said clock signal to a higher frequency signal;
        a frequency divider, coupled to said voltage-control oscillator, for reducing the frequency of said higher frequency signal; and
        a plurality of output control modules, coupled to said frequency divider, each for generating one of said delay signals, wherein each of said delay signals is delayed from an adjacent one of said delay signals; and
    a synchronization circuit for selecting one of said delay signals with a clock signal transition that is most closely positioned in time to a beam detect signal for performing print scan line synchronization within a laser printer.

2. The apparatus of claim 1, wherein said delay signal generation circuit further includes a feedback circuit coupled to said voltage-control oscillator and said frequency divider, wherein said feedback circuit receives output signals from said voltage-control oscillator and sends feedback signals to said voltage-control oscillator.

3. The apparatus of claim 1, wherein said selected one delay signals having the smallest phase difference from said beam detect signal is utilized to print a print scan for said scan line synchronization.

4. The apparatus of claim 1, wherein said each of said delay signals is delayed by no more than one tenth of a clock cycle from an adjacent one of said delay signals.

5. An electrophotographic printing system comprising:
    a photosensitive drum;
    a first retractor for positioning a sheet of printing paper within a first predetermined distance from said photosensitive drum;
    a second retractor for positioning said printing paper within a second predetermined distance from said photosensitive drum; and
    an apparatus for performing print scan line synchronizations, wherein said apparatus includes
        a delay signal generation circuit for generating a plurality of delay signals based on a clock signal, wherein said delay signal generation circuit includes
            a voltage-control oscillator for converting said clock signal to a higher frequency signal;
            a frequency divider, coupled to said voltage-control oscillator, for reducing the frequency of said higher frequency signal; and
            a plurality of output control modules, coupled to said frequency divider, each for generating one of said delay signals, wherein each of said delay signals is delayed from an adjacent one of said delay signals; and
        a synchronization circuit for selecting one of said delay signals with a clock signal transition that is most closely positioned in time to a beam detect signal for performing print scan line synchronizations within a laser printer.

6. The printing system of claim 5, wherein said delay signal generation circuit further includes a feedback circuit coupled to said voltage-control oscillator and said frequency divider, wherein said feedback circuit receives output signals from said voltage-control oscillator and sends feedback signals to said voltage-control oscillator.

7. The printing system of claim 5, wherein said selected one delay signals having the smallest phase difference from said beam detect signal is utilized to print a print scan for said scan line synchronization.

8. The printing system of claim 5, wherein said each of said delay signals is delayed by no more than one tenth of a clock cycle from an adjacent one of said delay signals.

* * * * *